US008961834B2

(12) United States Patent
Bastiaens et al.

(10) Patent No.: US 8,961,834 B2
(45) Date of Patent: Feb. 24, 2015

(54) CARBON NANOTUBE MASTERBATCH, PREPARATION THEREOF, AND USE IN FORMING ELECTRICALLY CONDUCTIVE THERMOPLASTIC COMPOSITION

(75) Inventors: Jos Bastiaens, Berendrecht (BE); Arno Hagenaars, Bergen op Zoom (NL)

(73) Assignee: Sabic Global Technologies B.V. (NL)

( * ) Notice: Subject to any disclaimer, the term of this patent is extended or adjusted under 35 U.S.C. 154(b) by 1008 days.

(21) Appl. No.: 13/069,440

(22) Filed: Mar. 23, 2011

(65) Prior Publication Data

US 2012/0241686 A1 Sep. 27, 2012

(51) Int. Cl.
H01B 1/24 (2006.01)
C08J 3/22 (2006.01)
C08L 71/12 (2006.01)
C01B 31/04 (2006.01)

(52) U.S. Cl.
CPC ... *C08J 3/22* (2013.01); *H01B 1/24* (2013.01); *C08L 71/12* (2013.01); *C01B 31/0423* (2013.01); *C08J 2377/06* (2013.01); *C08J 2471/10* (2013.01); *C08L 2203/02* (2013.01)
USPC ............ 252/511; 252/502; 252/510; 524/495

(58) Field of Classification Search
USPC .......................... 252/502, 510, 511; 524/495
See application file for complete search history.

(56) References Cited

U.S. PATENT DOCUMENTS

| 2,071,250 | A | 2/1937 | Carothers |
| 2,071,251 | A | 2/1937 | Carothers |
| 2,130,523 | A | 9/1938 | Carothers |
| 2,130,948 | A | 9/1938 | Carothers |
| 2,241,322 | A | 5/1941 | Hanford |
| 2,312,966 | A | 3/1943 | Hanford |
| 2,512,606 | A | 6/1950 | Bolton et al. |
| 2,933,480 | A | 4/1960 | Gersham et al. |
| 3,093,621 | A | 6/1963 | Gladding |
| 3,211,709 | A | 10/1965 | Adamek et al. |
| 3,306,874 | A | 2/1967 | Hay |
| 3,354,129 | A | 11/1967 | Edmonds, Jr. et al. |
| 3,646,168 | A | 2/1972 | Barrett |
| 3,790,519 | A | 2/1974 | Wahlborg |
| 3,884,993 | A | 5/1975 | Gros |
| 3,894,999 | A | 7/1975 | Boozer et al. |
| 3,919,177 | A | 11/1975 | Campbell |
| 4,059,654 | A | 11/1977 | Von Bodungen et al. |
| 4,794,164 | A | 12/1988 | Iwasaki et al. |
| 4,970,272 | A | 11/1990 | Gallucci |
| 5,132,365 | A | 7/1992 | Gallucci |
| 5,348,798 | A | 9/1994 | Berghuis et al. |
| 5,534,600 | A | 7/1996 | Bailly et al. |
| 5,591,382 | A | 1/1997 | Nahass et al. |
| 5,859,099 | A | 1/1999 | Kasowski |
| 6,221,283 | B1 | 4/2001 | Dharmarajan et al. |
| 6,348,527 | B1 * | 2/2002 | Nodera ........................ 524/127 |
| 6,593,411 | B2 | 7/2003 | Koevoets et al. |
| 6,753,365 | B2 | 6/2004 | Brown et al. |
| 6,783,746 | B1 * | 8/2004 | Zhang et al. ............... 423/447.1 |
| 7,153,899 | B2 | 12/2006 | Reddy et al. |
| 7,226,963 | B2 | 6/2007 | Koevoets et al. |
| 7,405,249 | B2 | 7/2008 | Kim |
| 7,405,250 | B2 | 7/2008 | Kim |
| 7,868,090 | B2 | 1/2011 | Juikar et al. |
| 8,257,613 | B2 | 9/2012 | Bastiaens et al. |
| 8,491,821 | B2 | 7/2013 | Kolditz et al. |
| 2003/0092824 | A1 * | 5/2003 | Bastiaens et al. ............. 524/495 |
| 2003/0151030 | A1 | 8/2003 | Gurin |
| 2009/0099300 | A1 * | 4/2009 | Gallucci et al. ............... 524/592 |
| 2009/0306273 | A1 | 12/2009 | Sokolowski |
| 2011/0003962 | A1 | 1/2011 | Carrillo et al. |
| 2011/0184128 | A1 | 7/2011 | Guo et al. |
| 2011/0233479 | A1 | 9/2011 | Korzhenko et al. |
| 2012/0217434 | A1 * | 8/2012 | I'Abee et al. .................. 252/74 |

FOREIGN PATENT DOCUMENTS

| EP | 0234060 A1 | 1/1986 |
| EP | 0675165 A1 | 3/1994 |
| EP | 0737717 A2 | 10/1996 |
| EP | 1813649 A1 | 8/2007 |
| EP | 2184324 A1 | 5/2010 |
| WO | 8806167 | 5/1988 |
| WO | 0121699 A1 | 3/2001 |
| WO | 2009104107 A1 | 8/2009 |
| WO | 2009125315 al | 10/2009 |
| WO | 2010089241 A1 | 8/2010 |

OTHER PUBLICATIONS

International Search Report; International Application No. PCT/IB2012/051163; International Filing Date Dec. 3, 2012; 3 pages.
Written Opinion of the International Searching Authority; International Application No. PCT/IB2012/051163; International Filing Date Dec. 3, 2012; 5 pages.
ASTM D1238-10, "Standard Test Method for Melt Flow Rates of Thermoplastics by Extrusion Plastometer", 2010, 15 pages.
CN101759992 A, Abstract, Jun. 30, 2010, 1 page.
ISO 180, Third Edition, Dec. 15, 2000, "Plastic—Determination of Izod impact strength", 16 pages.
ISO 306, Fourth Edition, Jul. 15, 2004, "Plastics—Thermoplastic materials—Determination of Vicat softening temperature (VST)", 16 pages.
ISO 307, Fifth Edition, May 15, 2007, "Plastics—Polyamides—Determination of viscosity number", 40 pages.
ISO 3167, Fourth Edition, Feb. 15, 2002, "Plastics—Multipurpose test specimens", 14 pages.
ISO 527-1, First Edition, Part 1, Jun. 15, 1993, "Plastics—Determination of tensile properties—Part 1: General principles", 12 pages.
ISO 527-2, First Edition, Part 2, Jun. 15, 1993, "Plastics—Determination of tensile properties—Part 2: Test conditions for moulding and extrusion plastics", 8 pages.
JP6145315 A, Abstract, May 24, 1994, 1 page.
U.S. Appl. No. 12/773,044, filed May 4, 2010.
U.S. Appl. No. 12/773,045, filed May 4, 2010.

* cited by examiner

*Primary Examiner* — Mark Kopec
*Assistant Examiner* — Haidung Nguyen
(74) *Attorney, Agent, or Firm* — Cantor Colburn LLP

(57) ABSTRACT

An electrically conductive thermoplastic composition is prepared by melt blending a polymer and a masterbatch of carbon nanotubes in wax having a melting point of about 45 to about 150° C. The masterbatch of carbon nanotubes in wax is more easily prepared than a conventional carbon nanotube masterbatch in high molecular weight polymer. Use of the masterbatch of carbon nanotubes in wax also improves the melt flow properties of the electrically conductive thermoplastic composition.

22 Claims, No Drawings

CARBON NANOTUBE MASTERBATCH, PREPARATION THEREOF, AND USE IN FORMING ELECTRICALLY CONDUCTIVE THERMOPLASTIC COMPOSITION

BACKGROUND OF THE INVENTION

Carbon nanotubes are hollow cylinders of carbon having diameters that are tens of thousands of times smaller than the diameter of a human hair. Carbon nanotubes have high strength and high electrical conductivity, making them useful in many applications. One specific use of carbon nanotubes is as an additive to create electrical conductivity in otherwise electrically insulating plastic materials. Because of health and safety concerns, carbon nanotubes are typically not handled in their pure form when they are used as additives to plastics. Instead, they are typically added to the base plastic as a concentrate or masterbatch in the same plastic or a different plastic. Such carbon nanotube masterbatches in plastic can be safely handled, and they facilitate an even distribution of the carbon nanotubes throughout the final plastic composition. However, the preparation of a carbon nanotube masterbatch in plastic requires a separate high-temperature compounding step that can negatively affect the characteristics and properties of the carbon nanotubes and/or the end product plastic. There is therefore a desire for methods of introducing carbon nanotubes to plastics that do not require a separate high-temperature compounding step. Further desirable would be methods that improve the melt flow of the end product plastic.

SUMMARY OF EMBODIMENTS OF THE INVENTION

One embodiment is a method of forming an electrically conductive thermoplastic composition, comprising: melt blending about 80 to about 98 weight percent, based on the weight of the electrically conductive thermoplastic composition, of a polymer, and about 2 to about 20 weight percent, based on the weight of the electrically conductive thermoplastic composition, of a carbon nanotube masterbatch comprising, based on the weight of the carbon nanotube masterbatch, about 10 to about 40 weight percent of carbon nanotubes, and about 60 to about 90 weight percent of a wax having a melting point of about 45 to about 150° C.

Another embodiment is a method of forming a carbon nanotube masterbatch, comprising: blending about 10 to about 40 weight percent of carbon nanotubes, and about 60 to about 90 weight percent of a wax having a melting point of about 45 to about 150° C.; wherein all weight percents are based on the weight of the carbon nanotube masterbatch.

Another embodiment is an electrically conductive thermoplastic composition, comprising: a poly(arylene ether) in an amount of about 20 to about 50 weight percent, based on the weight of the electrically conductive thermoplastic composition; a polyamide in an amount of about 30 to about 70 weight percent, based on the weight of the electrically conductive thermoplastic composition; and a carbon nanotube masterbatch in an amount of about 2 to about 20 weight percent, based on the weight of the electrically conductive thermoplastic composition; wherein the carbon nanotube masterbatch comprises carbon nanotubes in an amount of about 10 to about 40 weight percent, based on the weight of the carbon nanotube masterbatch, and a wax having a melting point of about 45 to about 150° C. in an amount of about 60 to about 90 weight percent, based on the weight of the carbon nanotube masterbatch; wherein the electrically conductive thermoplastic composition exhibits a volume resistivity less than or equal to 3,000 ohm-centimeters, and a melt viscosity of less than or equal to 200 pascal-seconds measured at 282° C. and a shear rate of 1,500 second$^{-1}$.

These and other embodiments are described in detail below.

DETAILED DESCRIPTION OF THE INVENTION

The present inventors have determined that the separate high temperature compounding step required for forming a carbon nanotube masterbatch in plastic can be avoided using a carbon nanotube masterbatch prepared in a wax that melts at a temperature significantly lower than the melting point or glass transition temperature of most plastics used to form carbon nanotube masterbatches in plastic. Thus, one embodiment is a method of forming an electrically conductive thermoplastic composition, comprising: melt blending about 80 to about 98 weight percent, based on the weight of the electrically conductive thermoplastic composition, of a polymer, and about 2 to about 20 weight percent, based on the weight of the electrically conductive thermoplastic composition, of a carbon nanotube masterbatch comprising, based on the weight of the carbon nanotube masterbatch, about 10 to about 40 weight percent of carbon nanotubes, and about 60 to about 90 weight percent of a wax having a melting point of about 45 to about 150° C.

The carbon nanotube masterbatch comprises carbon nanotubes and a wax. As used herein, the term "wax" refers to a substance that is a pliable solid at 25° C. and one atmosphere. The wax has a melting point of about 45 to about 150° C. Within this range, the melting point can be about 50 to about 130° C., specifically about 55 to about 110° C., more specifically about 60 to about 90° C., even more specifically about 60 to about 80° C., yet more specifically about 60 to about 70° C.

Types of waxes suitable for use in the present method include fatty alcohols, fatty acids, fatty acid salts (also known as "soaps"), fatty acid amides, fatty acid esters, polyolefin waxes, paraffin waxes, and combinations thereof.

Specific fatty alcohols include, for example, cetyl alcohol (1-hexadecanol, melting point=49° C.), stearyl alcohol (1-octadecanol, melting point=60° C.), arachidyl alcohol (1-eicosanol, melting point=64° C.), behenyl alcohol (1-docosanol, melting point=71° C.), lignoceryl alcohol (1-tetracosanol, melting point=77° C.), ceryl alcohol (1-hexacosanol), montanyl alcohol (1-octacosanol, melting point=83° C.), myricyl alcohol (1-triacontanol, melting point=87° C.), geddyl alcohol (1-tetratriacontanol), and combinations thereof.

Specific fatty acids include, for example, myristic acid (tetradecanoic acid, melting point=54.4 C.°), palmitic acid (hexadecanoic acid, melting point=63° C.), stearic acid (octadecanoic acid, melting point=70° C.), arachidic acid (eicosanoic acid, melting point=75.5° C.), behenic acid (docosanoic acid, melting point=80° C.), lignoceric acid (tetracosanoic acid, melting point=84° C.), cerotic acid (hexacosanoic acid), montanic acid (octacosanoic acid, melting point=91° C.), and combinations thereof.

Specific fatty acid salts include, for example, calcium laurate (melting point=150-170° C.), calcium stearate (melting point=145-155° C.), calcium montanate (melting point=147° C.), zinc stearate (melting point=120-130° C.), and combinations thereof.

Specific fatty acid amides include, for example, lauramide (melting point=110° C.), myristamide, palmitamide, stearamide, arachidamide, behenamide, lignoceramide, cerotamide, montanamide, erucamide (melting point=76° C.), oleamide (melting point=102-104° C.), ethylene bis(lauramide) (melting point=95-105° C.), ethylene bis(stearamide) (melting point=144-146° C.), and combinations thereof.

Specific fatty acid esters include, for example, glycerol monostearate (melting point=58-59° C.), ethylene glycol montanate (melting point=79-85° C.), glycerol montanate (melting point=77-83° C.), pentaerythritol tetrastearate (melting point=60-66° C.), trimethylolpropane tristearate, sorbitan tristearate, and combinations thereof. In some embodiments, the wax comprises pentaerythritol tetrastearate.

Specific polyolefin waxes include, for example, polyethylene waxes, polar polyethylene waxes, polypropylene waxes, polar polypropylene waxes, and mixtures thereof. Polyethylene waxes are polyethylenes having number average molecular weights of about 1,000 to about 10,000. They are typically produced either by thermal degradation of higher molecular weight polyethylenes or directly via polymerization of ethylene. Like polyethylene waxes, polypropylene waxes have number average molecular weights of about 1,000 to about 10,000. Polypropylene waxes are produced by thermal degradation of polypropylene or by polymerization of propylene. Polar polyethylene waxes are typically produced by oxidation of low molecular weight polyethylene in air. The oxidation produces alcohol, ketone, and carboxylic acid groups on the polyethylene. The polarity of the polyethylene wax can be characterized by an acid value, which is a measure of the carboxylic acid group content. In some embodiments, the acid value is about 10 to about 70, specifically about 15 to about 30. Polar polypropylene waxes are produced by maleic anhydride grafting.

In some embodiments, the wax comprises a paraffin wax.

In addition to the wax, the carbon nanotube masterbatch includes carbon nanotubes. The carbon nanotubes used can undergo roping and can be single wall carbon nanotubes and/or multiwall carbon nanotubes. Carbon nanotubes used in the carbon nanotube composition can be produced, for example, by laser-evaporation of graphite, chemical vapor deposition, carbon arc synthesis, or the high-pressure carbon monoxide conversion process (HIPCO) process.

The single wall carbon nanotubes generally have a single wall comprising a graphene sheet with outer diameters of about 0.7 to about 2.4 nanometers. It is generally desirable for the single wall carbon nanotubes to have an inherent thermal conductivity of at least 2000 Watts per meter Kelvin (W/m-K) and for the single wall carbon nanotube ropes to have an inherent electrical conductivity of $10^4$ Siemens/centimeter (S/cm). It is also generally desirable for the Single wall carbon nanotubes to have a tensile strength of at least 80 gigapascals (GPa) and a stiffness of at least about 0.5 terapascals (TPa).

In another embodiment, the single wall carbon nanotubes comprise a mixture of metallic nanotubes and semi-conducting nanotubes. Metallic nanotubes are those that display electrical characteristics similar to metals, while the semi-conducting nanotubes are those that are electrically semi-conducting. In general the manner in which the graphene sheet is rolled up produces nanotubes of various helical structures. Zigzag and armchair nanotubes constitute the two possible confirmations. In order to minimize the quantity of single wall carbon nanotubes utilized in the composition, it is generally desirable to have the metallic nanotubes constitute a large fraction of the total amount of single wall carbon nanotubes used in the composition. It is generally desirable for the single wall carbon nanotubes used in the composition to comprise metallic nanotubes in an amount of greater than or equal to about 1 weight percent of the total weight of the single wall carbon nanotubes. In one embodiment, it is desirable to have metallic nanotubes in an amount of greater than or equal to about 20 weight percent, while in another embodiment, it is desirable to have metallic nanotubes in an amount of greater than or equal to about 30 weight percent of the total weight of the single wall carbon nanotubes. In yet another embodiment, it is desirable to have metallic nanotubes in an amount of greater than or equal to about 50 weight percent, while in another embodiment, it is desirable to have metallic nanotubes in an amount of greater than or equal to about 99.9 weight percent of the total weight of the single wall carbon nanotubes.

The multiwall carbon nanotubes generally have multiple walls comprising graphene sheet with outer diameters of about 1.4 to about 500 nanometers (nm). Multiwall carbon nanotubes have at least two graphene layers bound around at least a portion of an inner hollow core. In one embodiment, the multiwall carbon nanotubes have only two graphene layers, while in another embodiment, the multiwall carbon nanotubes have only three graphene layers. Multiwall carbon nanotubes having only two graphene layers are termed double wall carbon nanotubes, while multiwall carbon nanotubes having only three graphene layers are termed triple wall carbon nanotubes. Hemispherical caps generally close both ends of the multiwall carbon nanotubes, but it may be desirable to use multiwall carbon nanotubes having only one hemispherical cap or multiwall carbon nanotubes, which are devoid of both caps. It is generally desirable to use multiwall carbon nanotubes having average diameters less than or equal to about 40 nanometers. In one embodiment, it is desirable to use multiwall carbon nanotubes having diameters of less than or equal to about 30 nanometers, while in another embodiment it is desirable to use multiwall carbon nanotubes having diameters less than or equal to about 20 nanometers.

Carbon nanotubes having aspect ratios of greater than or equal to about 5 are generally utilized. In some embodiments, the aspect ratio is greater than or equal to 100, while in other embodiments, the aspect ratio is greater than or equal to 1,000. The carbon nanotubes generally comprise a central portion, which is typically hollow but can be at least partially filled with amorphous carbon.

The carbon nanotube masterbatch comprises, based on the weight of the carbon nanotube masterbatch, about 10 to about 40 weight percent of carbon nanotubes. Within this range, the carbon nanotube amount can be about 15 to about 35 weight percent, specifically about 20 to about 30 weight percent, more specifically about 20 to about 25 weight percent. The carbon nanotube masterbatch also comprises, based on the weight of the carbon nanotube masterbatch, about 60 to about 90 weight percent of the wax having a melting point of about 45 to about 150° C. Within this range, the wax amount can be about 65 to about 85 weight percent, specifically about 70 to about 80 weight percent, more specifically about 75 to about 80 weight percent.

The carbon nanotube masterbatch is formed by blending about 10 to about 40 weight percent of the carbon nanotubes and about 60 to about 90 weight percent of the wax, wherein the weight percents are based on the weight of the carbon nanotube masterbatch. The wax and the carbon nanotubes can be blended using any method and equipment capable of dispersing the carbon nanotubes in the wax. In some embodiments, the blending comprises melt blending at a temperature about 10 to about 150 degrees centigrade above the melting point of the wax. Within this range, the melt blending temperature can be about 20 to about 120 degrees centigrade above the melting point of the wax, specifically about 30 to about 90 degrees centigrade above the melting point of the wax, more specifically about 40 to about 60 degrees centigrade above the melting point of the wax. Apparatus suitable for melt blending the wax and the carbon nanotubes includes batch-wise and continuous processing equipment such as, for example, Brabender mixers, ribbon-blade batch mixers, high-shear batch mixers, single-screw extruders, and twin-screw extruders.

In some embodiments, the carbon nanotube masterbatch consists of the carbon nanotubes and the wax. In some embodiments, the wax comprises pentaerythritol tetrastearate.

One embodiment is a carbon nanotube masterbatch formed by the process above.

As noted above, the carbon nanotube masterbatch is melt-blended with a polymer to form an electrically conductive thermoplastic composition. Suitable polymers include, for example, polyesters, poly(vinyl chloride)s, polystyrenes, rubber-modified polystyrenes, polyolefins, polycarbonates, polyimides, polyetherimides, poly(ether ketone)s, poly(ether ether ketone)s, polysulfones, poly(arylene ether)s, poly(phenylene sulfide)s, polyamides, copolymers of styrene and acrylonitrile, copolymers of alpha-methylstyrene and acrylonitrile, copolymers of acrylonitrile and butadiene and styrene, copolymers of acrylonitrile and styrene and acrylate esters, polyacetals, thermoplastic polyurethanes, and combinations thereof.

In some embodiments, the polymer comprises a poly(arylene ether). Suitable poly(arylene ether)s include those comprising repeating structural units having the formula

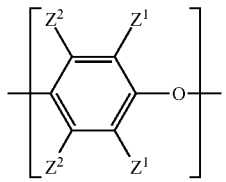

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more halogen atoms, nitro groups, cyano groups, carboxylic acid groups, ester groups, amide groups, sulfonyl groups, sulfoxyl groups, sulfonamide groups, sulfamoyl groups, alkoxyl groups, amino groups, hydroxyl groups, or the like, or it can contain heteroatoms or carbonyl groups within the backbone of the hydrocarbyl residue. As one example, $Z^1$ can be a di-n-butylaminomethyl group formed by reaction of the di-n-butylamine component of an oxidative polymerization catalyst with the methyl group of a terminal 3,5-dimethyl-4-hydroxyphenyl group. As another example, $Z^1$ can be a morpholinomethyl group formed by reaction of the morpholine component of an oxidative polymerization catalyst with the methyl group of a terminal 3,5-dimethyl-4-hydroxyphenyl group.

In some embodiments, the poly(arylene ether) has an intrinsic viscosity of about 0.25 to about 1 deciliter per gram measured at 25° C. in chloroform. Within this range, the poly(arylene ether) intrinsic viscosity can be about 0.3 to about 0.65 deciliter per gram, more specifically about 0.35 to about 0.5 deciliter per gram, even more specifically about 0.4 to about 0.5 deciliter per gram.

In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. The poly(arylene ether) molecular weight distribution is typically analyzed in the molecular weight range from 250 to 1,000,000 atomic mass units. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis. A poly(arylene ether) having these molecular weight characteristics can be prepared using a morpholine-containing catalyst as described, for example, in U.S. patent application Ser. No. 13/057,480, filed Feb. 4, 2011.

In some embodiments, the poly(arylene ether) is a poly(2,6-dimethyl-1,4-phenylene ether) prepared with a morpholine-containing catalyst, wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample. In some embodiments, the purified sample after separation into six equal poly(2,6-dimethyl-1,4-phenylene ether) weight fractions of decreasing molecular weight comprises a first, highest molecular weight fraction comprising at least 10 mole percent of poly(2,6-dimethyl-1,4-phenylene ether) comprising a terminal morpholine-substituted phenoxy group. The poly(2,6-dimethyl-1,4-phenylene ether) according to these embodiments is further described in U.S. Patent Application Publication No. US 2011/0003962 A1 of Carrillo et al.

In some embodiments, the poly(arylene ether) is essentially free of incorporated diphenoquinone residues. In the context, "essentially free" means that the less than 1 weight percent of poly(arylene ether) molecules comprise the residue of a diphenoquinone. As described in U.S. Pat. No. 3,306,874 to Hay, synthesis of poly(arylene ether) by oxidative polymerization of monohydric phenol yields not only the desired poly(arylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(arylene ether) (i.e., the diphenoquinone is incorporated into the poly(arylene ether) structure by heating the polymerization reaction mixture to yield a poly(arylene ether) comprising terminal or internal diphenoquinone residues. For example, as shown in Scheme 1, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(arylene ether) with terminal and internal residues of incorporated diphenoquinone.

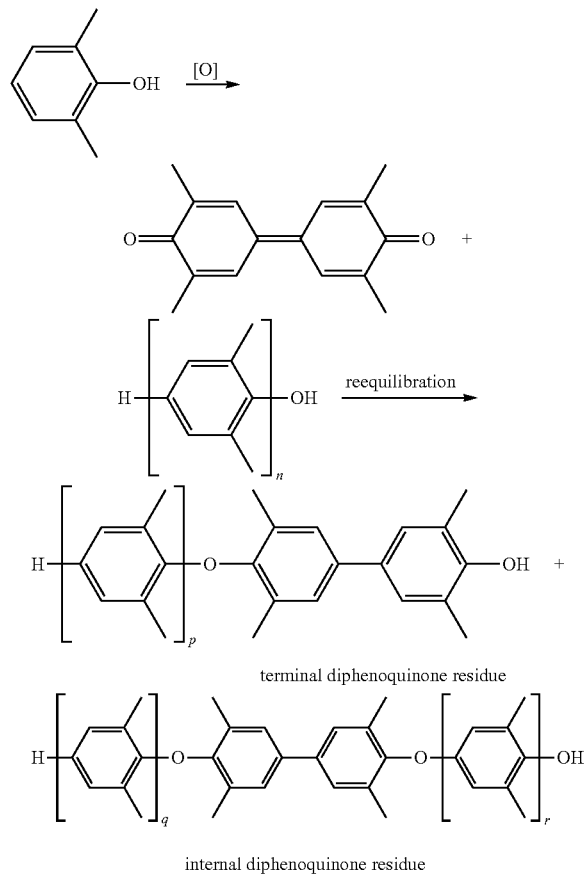

Scheme 1

However, such reequilibration reduces the molecular weight of the poly(arylene ether) (e.g., p and q+r are less than n). Accordingly, when a higher molecular weight and/or process-stable molecular weight poly(arylene ether) is desired, it may be desirable to separate the diphenoquinone from the poly(arylene ether) rather than reequilibrating the diphenoquinone into the poly(arylene ether) chains. Such a separation can be achieved, for example, by precipitation of the poly(arylene ether) in a solvent or solvent mixture in which the poly(arylene ether) is insoluble and the diphenoquinone is soluble, while minimizing the time between the end of the polymerization reaction (e.g., termination of oxygen flow) and precipitation of the poly(arylene ether). For example, when a poly(arylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(arylene ether) chain can be minimized (e.g., by isolating the poly(arylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene or a toluene/methanol mixture, a solution containing diphenoquinone and poly(arylene ether) can be adjusted to a temperature of about 25° C., and the insoluble diphenoquinone can be removed by solid-liquid separation (e.g., filtration).

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). In some embodiments, the poly(arylene ether) comprises a poly(2,6-dimethyl-1,4-phenylene ether) having an intrinsic viscosity of about 0.35 to about 0.5 deciliter per gram, specifically about 0.35 to about 0.46 deciliter per gram, measured at 25° C. in chloroform.

The poly(arylene ether) can comprise molecules having an aminoalkyl-containing end group, typically located in a position ortho to the hydroxy group. Thus, the poly(arylene ether) can, for example, comprise a 3-di-n-butylamino-5-methyl-4-hydroxyphenyl group (derived from reaction with di-n-butylamine as a catalyst component) or a 3-morpholino-5-methyl-4-hydroxyphenyl group (derived from reaction with morpholine as a catalyst component). Also frequently present are tetramethyldiphenoquinone (TMDQ) end groups, typically obtained from 2,6-dimethylphenol-containing reaction mixtures in which tetramethyldiphenoquinone by-product is present. In some embodiments the poly(arylene ether) comprises diphenoquinone residue in an amount of less than about 5 weight percent, specifically less than about 3 weight percent, more specifically less than about 1 weight percent, based on the weight of the poly(arylene ether). In some embodiments, the poly(arylene ether) comprises, on average, about 0.7 to about 2 moles, specifically about 1 to about 1.5 moles, of chain-terminal hydroxyl groups per mole of poly(arylene ether). The poly(arylene ether) can be in the form of a homopolymer, a copolymer, a graft copolymer, an ionomer, or a block copolymer, as well as combinations comprising at least one of the foregoing.

In some embodiments, the polymer comprises a polyamide. Polyamides, also known as nylons, are characterized by the presence of a plurality of amide (—C(O)NH—) groups and are described in U.S. Pat. No. 4,970,272 to Gallucci. Suitable polyamides include polyamide-6, polyamide-6,6, polyamide-4, polyamide-4,6, polyamide-12, polyamide-6,10, polyamide-6,9, polyamide-6,12, amorphous polyamides, polyamide-6/6T and polyamide-6,6/6T with triamine contents below 0.5 weight percent, polyamide-9T, and combinations thereof. In some embodiments, the polyamide comprises a polyamide-6,6. In some embodiments, the polyamide comprises a polyamide-6 and a polyamide-6,6. In some embodiments, the polyamide or combination of polyamides has a melting point ($T_m$) greater than or equal to 171° C. When the polyamide comprises a super tough polyamide, that is, a rubber-toughened polyamide, the composition may or may not contain a separate impact modifier.

Polyamides can be obtained by a number of well known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamides are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent solution in 96 weight percent sulfuric acid in accordance with ISO 307. The polyamide can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 weight percent solution in 96 weight percent sulfuric acid.

In some embodiments, the polyamide comprises a polyamide having an amine end group concentration greater than or equal to 35 micro equivalents amine end group per gram of polyamide (µeq/g) as determined by titration with HCl. The amine end group concentration can be greater than or equal to 40 µeq/g, or, more specifically, greater than or equal to 45 µeq/g Amine end group content can be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

In some embodiments, the polymer comprises a poly (arylene ether) and a polyamide. In these embodiments, the poly(arylene ether) amount can be about 30 to about 50 weight percent, specifically about 32 to about 40 weight percent, and the polyamide amount can be about 30 to about 70 weight percent, specifically about 40 to about 60 weight percent, based on the total weight of the electrically conductive thermoplastic composition.

In some embodiments, a compatibilizing agent is used to facilitate formation of a compatibilized blend of the polyamide and the poly(arylene ether). As used herein, the term "compatibilizing agent" refers to a polyfunctional compound that interacts with the poly(arylene ether), the polyamide, or both. This interaction can be chemical (for example, grafting) and/or physical (for example, affecting the surface characteristics of the dispersed phases). In either instance the resulting polyamide-poly(arylene ether) blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(arylene ether)s and polyamides that are physically compatible without such agents (as, for example, from compatibility-enhancing dibutylaminomethyl substituents on the poly(arylene ether)).

Examples of compatibilizing agents that can be employed include liquid diene polymers, epoxy compounds, oxidized polyolefin wax, quinones, organosilane compounds, polyfunctional compounds, functionalized poly(arylene ether)s, and combinations thereof. Compatibilizing agents are further described in U.S. Pat. No. 5,132,365 to Gallucci, and U.S. Pat. Nos. 6,593,411 and 7,226,963 to Koevoets et al.

In some embodiments, the compatibilizing agent comprises a polyfunctional compound. Polyfunctional compounds that can be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_{11}H_{2n-9}OH$, wherein n is a positive integer less than or equal to 30); unsaturated amines resulting from replacing from replacing the —OH group(s) of the above unsaturated alcohols with —$NH_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which can be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

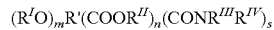

$(R^IO)_mR'(COOR^{II})_n(CONR^{III}R^{IV})_s$ wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The foregoing compatibilizing agents can be added directly to the melt blend or pre-reacted with either or both of the poly(arylene ether) and the polyamide, as well as with any other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with and consequently functionalize the poly(arylene ether). For example, the poly(arylene ether) can be pre-reacted with maleic anhydride to form an anhydride-functionalized poly(arylene ether) that has improved compatibility with the polyamide compared to a non-functionalized poly(arylene ether).

When a compatibilizing agent is employed in the preparation of a compatibilized polyamide-poly(arylene ether) composition, the amount used will be dependent upon the specific compatibilizing agent chosen and the specific polymeric system to which it is added. In some embodiments, the compatibilizing agent amount is about 0.1 to about 1 weight percent, specifically about 0.2 to about 0.8 weight percent, more specifically about 0.3 to about 0.6 weight percent, based on the total weight of the thermoplastic composition.

In some embodiments, the polymer comprises a polystyrene. Polystyrenes include, for example, atactic, syndiotactic, and isotactic hompolystyrenes. In some embodiments, the polymer comprises a poly(arylene ether) and a polystyrene.

In some embodiments, the polymer comprises a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene. In some embodiments, the rubber-modified polystyrene has an effective gel content of 10 to 35 percent. Suitable rubber-modified polystyrenes are commercially available as, for example, GEH 1897 from SABIC Innovative Plastics, and D7022.27 from Chevron. In some embodiments, the polymer comprises a poly(arylene ether) and a rubber-modified polystyrene.

In some embodiments, the polymer comprises a polyolefin. Polyolefins include polyethylenes (including high density polyethylene (HDPE), low density polyethylene (LDPE), medium density polyethylene (MDPE), and linear low density polyethylene (LLDPE)), polypropylenes (including atactic, syndiotactic, and isotactic polypropylenes), and polyisobutylenes. Polyolefins and methods for their preparation are known in the art and are described for example in U.S. Pat. No. 2,933,480 to Gresham et al., U.S. Pat. No. 3,093,621 to Gladding, U.S. Pat. No. 3,211,709 to Adamek et al., U.S. Pat. No. 3,646,168 to Barrett, U.S. Pat. No. 3,790,519 to Wahlborg, U.S. Pat. No. 3,884,993 to Gros, U.S. Pat. No. 3,894,999 to Boozer et al., and U.S. Pat. No. 4,059,654 to von Bodungen. In some embodiments the polyolefin consists essentially of a polyolefin homopolymer, specifically a crystalline polyolefin homopolymer. The density of polyethylene (HDPE, LDPE, MDPE, LLDPE) can be 0.90 gram/cm$^3$ to 0.98 gram/cm$^3$. Polyolefins include ethylene/α-olefin copolymers, such as copolymers of ethylene and 1-butene, copolymers of ethylene and 1-hexene, and copolymers of ethylene and 1-octene. Additionally, copolymers of olefins can also be used, such as copolymers of polypropylene with rubber and polyethylene with rubber. Copolymers of polypropylene and rubber are sometimes referred to as impact modified polypropylene. Such copolymers are typically heterophasic and have sufficiently long sections of each component to have both amorphous and crystalline phases. In some embodiments the polyolefin comprises a polyolefin block copolymer comprising an end group consisting essentially of a polyolefin homopolymer of $C_2$ to $C_3$ olefins and a middle block comprising a copolymer of $C_2$ to $C_{12}$ olefins. Additionally the polyolefin can comprise a combination of homopolymer and copolymer, a combination of homopolymers having different melt temperatures, and/or a combination of homopolymers having a different melt flow rate. In some embodiments, the polyolefin comprises a high density polyethylene (HDPE). The high density polyethylene can have a density of 0.941 to 0.965 grams per milliliter. In some embodiments, the polyolefin has a melt flow rate (MFR) of about 0.3 to about 10 grams per ten minutes (g/10 min) Specifically, the melt flow rate can be about 0.3 to about 5 grams per ten minutes. Melt flow rate can be determined according to ASTM D1238-10 using either powdered or pelletized polyolefin, a load of 2.16 kilograms and a temperature suitable for the polyolefin (190° C. for ethylene-based polyolefins and 230° C. for propylene-based polyolefins). In some embodiments, the polyolefin comprises homopolyethylene or a polyethylene copolymer. Additionally the polyethylene can comprise a combination of homopolymer and copolymer, a combination of homopolymers having different melting temperatures, and/or a combination of homopolymers having different melt flow rates. The polyethylene can have a density of 0.911 to 0.98 grams per cubic centimeter. In some embodiments, the polymer comprises a poly(arylene ether) and a polyolefin.

In some embodiments, the polymer comprises a hydrogenated block copolymer of an alkenyl aromatic compound and a conjugated diene. For brevity, this component is referred to as the "hydrogenated block copolymer". The hydrogenated block copolymer can comprise about 10 to about 90 weight percent of poly(alkenyl aromatic) content and about 90 to about 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is about 10 to less than 40 weight percent, specifically about 20 to about 35 weight percent, more specifically about 25 to about 35 weight percent, yet more specifically about 30 to about 35 weight percent, all based on the weight of the low poly(alkenyl aromatic content) hydrogenated block copolymer. In other embodiments, the hydrogenated block copolymer is a high poly(alkenyl aromatic content) hydrogenated block copolymer in which the poly(alkenyl aromatic) content is 40 to about 90 weight percent, specifically about 50 to about 80 weight percent, more specifically about 60 to about 70 weight percent, all based on the weight of the high poly (alkenyl aromatic content) hydrogenated block copolymer. In some embodiments, the high poly(alkenyl aromatic) content hydrogenated block copolymer comprises 40 to about 50 weight percent of poly(alkenyl aromatic) content, based on the weight of the high poly(alkenyl aromatic) content hydrogenated block copolymer.

In some embodiments, the hydrogenated block copolymer has a weight average molecular weight of about 40,000 to about 400,000 atomic mass units. The number average molecular weight and the weight average molecular weight can be determined by gel permeation chromatography and based on comparison to polystyrene standards. In some embodiments, the hydrogenated block copolymer has a weight average molecular weight of about 200,000 to about 400,000 atomic mass units, specifically about 220,000 to about 350,000 atomic mass units. In other embodiments, the hydrogenated block copolymer can have a weight average molecular weight of about 40,000 to about 200,000 atomic mass units, specifically about 40,000 to about 180,000 atomic mass units, more specifically about 40,000 to about 150,000 atomic mass units.

The alkenyl aromatic monomer used to prepare the hydrogenated block copolymer can have the structure

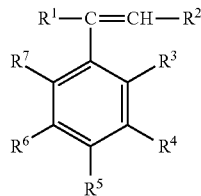

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from Kraton Polymers as KRATON G1730; the maleic anhydride-grafted polystyrene-poly(ethylene-butylene)-polystyrene triblock copolymers available from Kraton Polymers as KRATON G1901, G1924, and MD-6684; the maleic anhydride-grafted polystyrene-poly(ethylene-butylene-styrene)-polystyrene triblock copolymer available from Kraton Polymers as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the hydrogenated radial block copolymers available from Chevron Phillips Chemical Company as K-Resin KK38, KR01, KR03, and KR05; the polystyrene-poly(ethylene-butylene)-polystyrene triblock copolymer comprising 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104. Mixtures of two of more hydrogenated block copolymers can be used.

When the polymer comprises a poly(arylene ether), a polyamide, and a hydrogenated block copolymer, the poly(arylene ether) amount can be about 30 to about 50 weight percent, specifically about 32 to about 40 weight percent, the polyamide amount can be about 30 to about 70 weight percent, specifically about 40 to about 60 weight percent, and the hydrogenated block copolymer amount can be about 5 to about 30 weight percent, specifically about 10 to about 20 weight percent, all based on the total weight of the electrically conductive thermoplastic composition.

In some embodiments, the polymer comprises a poly(phenylene sulfide). Poly(phenylene sulfide)s are a known class of polymers containing arylene groups separated by sulfur atoms. They include poly(phenylene sulfide)s, for example poly(p-phenylene sulfide), and substituted poly(phenylene sulfide)s. Typical poly(phenylene sulfide)s comprise at least 70 mole percent, specifically at least 90 mole percent, more specifically at least 95 mole percent, of recurring para-phenylene sulfide units having the structure

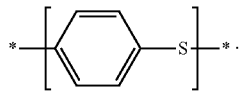

When the amount of said recurring units is less than 70 molar %, the heat resistance is somewhat limited. The remaining up to 30 mole percent of recurring units in the poly(phenylene sulfide) can, in some embodiments, have a structure selected from

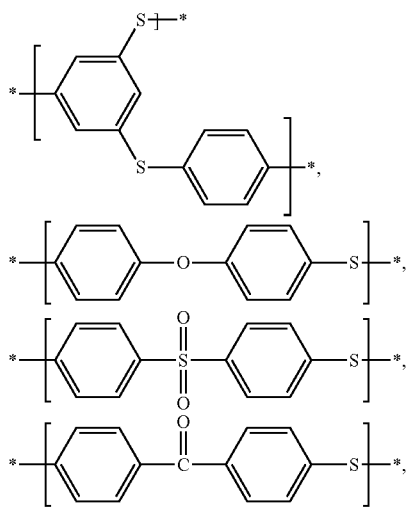

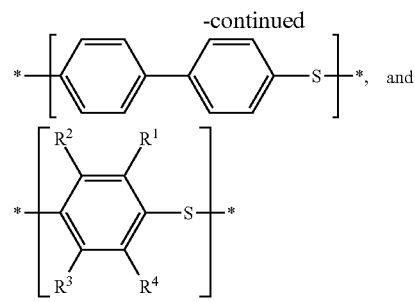

wherein $R^1$, $R^2$, $R^3$ and $R^4$ are, independently at each occurrence, hydrogen, halogen, $C_1$-$C_{12}$ hydrocarbyl, $C_1$-$C_{12}$ hydrocarbyloxy, nitro, amino, carboxy, or the like.

The poly(phenylene sulfide) can be a linear, branched, or cured polymer, or a mixture of at least two of the foregoing. Linear poly(phenylene sulfide)s of relatively low molecular weight can be prepared by, for example, the process disclosed in U.S. Pat. No. 3,354,129 to Edmonds et al. Linear poly(arylene sulfide)s having a relatively high molecular weight can be prepared by, for example, the process disclosed in U.S. Pat. No. 3,919,177 of Campbell. Branched poly(phenylene sulfide)s can be prepared by the use of a branching agent, for example, 1,3,5-trichlorobenzene, which is disclosed in U.S. Pat. No. 4,794,164 of Iwasaki et al. The degree of polymerization of the poly(phenylene sulfide)s prepared by the process of U.S. Pat. Nos. 3,354,129, 3,919,177 and 4,794,164 can be further increased by heating in an oxygen atmosphere or in the presence of a crosslinking agent such as, for example, a peroxide after polymerization.

The poly(phenylene sulfide) can be functionalized or unfunctionalized. If the poly(phenylene sulfide) is functionalized, the functional groups can include amino, carboxylic acid, metal carboxylate, disulfide, thiol, and metal thiolate groups. One method for incorporation of functional groups into poly(phenylene sulfide) can be found in U.S. Pat. No. 4,769,424 to Takekoshi et al., which discloses incorporation of substituted thiophenols into halogen substituted poly(arylene sulfide)s. Another functionalizing method involves incorporation of chloro-substituted aromatic compounds containing the desired functionality reacted with an alkali metal sulfide and chloroaromatic compounds. A third functionalizing method involves reaction of poly(phenylene sulfide) with a disulfide containing the desired functional groups, typically in the melt or in a suitable high boiling solvent such as chloronapthalene.

Though the melt viscosity of poly(phenylene sulfide) used in the present invention is not particularly limited so far as the moldings which can be obtained, a melt viscosity of at least 100 Poise is preferred from the viewpoint of the toughness of poly(phenylene sulfide) per se and that of 10,000 Poise or less is preferred from the viewpoint of the moldability. In some embodiments, the poly(phenylene sulfide) can have a melt flow rate less than or equal to 100 grams per 10 minutes measured at 316° C. and 5 kilogram load according to ASTM D1238. Specifically, the melt flow rate can be 50 to 100 grams per 10 minutes.

The poly(phenylene sulfide) can also be treated to remove unwanted contaminating ions by immersing the resin in deionized water or by treatment with an acid, typically hydrochloric acid, sulfuric acid, phosphoric acid, or acetic acid. For some product applications, it is preferred to have a very low impurity level, represented as the percent by weight ash remaining after burning a poly(phenylene sulfide) sample. Typically the ash content is less than or equal to 1 weight percent, specifically less than or equal to 0.5 weight percent, more specifically less than or equal to 0.1 weight percent.

In some embodiments, the polymer comprises a poly(arylene ether) and a poly(phenylene sulfide).

In some embodiments, the polymer comprises a polyester. Suitable polyesters include, for example, poly(ethylene terephthalate) and poly(butylene terephthalate). In some embodiments, the polymer comprises a poly(arylene ether) and a polyester.

The electrically conductive thermoplastic composition is formed by a method comprising: melt blending about 80 to about 98 weight percent, based on the weight of the electrically conductive thermoplastic composition, of the polymer, and about 2 to about 20 weight percent, based on the weight of the electrically conductive thermoplastic composition, of the carbon nanotube masterbatch. Within the range of about 80 to about 98 weight percent, based on the weight of the electrically conductive thermoplastic composition, the polymer amount can be about 84 to about 97 weight percent, specifically about 88 to about 96 weight percent, more specifically about 92 to about 95 weight percent. Within the range of about 2 to about 20 weight percent, based on the weight of the electrically conductive thermoplastic composition, the carbon nanotube masterbatch amount can be about 3 to about 16 weight percent, specifically about 4 to about 12 weight percent, more specifically about 5 to about 8 weight percent.

The melt blending of the polymer and the carbon nanotube masterbatch can be conducted, for example, in a Brabender mixer, a single-screw extruder, or a twin-screw extruder. Melt blending is typically conducted at temperature about 10 to about 100° C. greater than the melting point or glass transition temperature of the most heat-resistant polymer component in the electrically conductive thermoplastic composition.

In some embodiments, the polymer comprises about 20 to about 50 weight percent, based on the weight of the electrically conductive thermoplastic composition, of a poly(arylene ether); the polymer further comprises about 30 to about 70 weight percent, based on the weight of the electrically conductive thermoplastic composition, of a polyamide; melt blending comprises melt blending the poly(arylene ether) and the polyamide to form a polymer blend, and melt blending the polymer blend with the carbon nanotube masterbatch; and melt blending the poly(arylene ether) and the polyamide and melt blending the polymer blend with the carbon nanotube masterbatch are both conducted within a single pass through an extruder. Thus, in these embodiments, the electrically conductive poly(arylene ether)-polyamide blend is prepared in a single pass through a single extruder.

In some embodiments, the polymer comprises about 20 to about 50 weight percent, based on the weight of the electrically conductive thermoplastic composition, of a poly(arylene ether); the polymer further comprises about 30 to about 70 weight percent, based on the weight of the electrically conductive thermoplastic composition, of a polyamide; and melt blending comprises melt blending the poly(arylene ether) and the polyamide to form a polymer blend, pelletizing the polymer blend, and melt blending the pelletized polymer blend with the carbon nanotube masterbatch. Thus, in these embodiments, the electrically conductive poly(arylene ether)-polyamide blend is prepared using at least two extruder passes. The at least two passes can be through the same extruder or through different extruders. For example, the second pass (melting blending the pelletized polymer blend with the carbon nanotube masterbatch) can be conducted in the extruder associated with an injection molding machine.

All of the compositional variations described above in the context of the carbon nanotube masterbatch apply as well to the method of forming the electrically conductive thermoplastic composition. For example, in some embodiments, the nanotubes comprise single wall carbon nanotubes. In some embodiments, the nanotubes comprise multiwall carbon nanotubes.

In a very specific embodiment of forming the electrically conductive thermoplastic composition, the electrically conductive thermoplastic composition comprises about 88 to about 96 weight percent, based on the weight of the electrically conductive thermoplastic composition, of the polymer; the polymer comprises a poly(arylene ether) and a polyamide; the electrically conductive thermoplastic composition comprises about 2 to about 12 weight percent, based on the weight of the electrically conductive thermoplastic composition, of the wax; the wax comprises pentaerythritol tetrastearate; and the carbon nanotubes comprise multiwall carbon nanotubes.

In some embodiments, the polymer comprises about 20 to about 50 weight percent, based on the weight of the electrically conductive thermoplastic composition, of a poly(arylene ether), and about 30 to about 70 weight percent, based on the weight of the electrically conductive thermoplastic composition, of a polyamide. Within the range of about 20 to about 50 weight percent, the poly(arylene ether) amount can be about 25 to about 45 weight percent, specifically about 30 to about 40 weight percent, more specifically about 32 to about 38 weight percent. Within the range of about 30 to about 70 weight percent, the polyamide amount can be about 35 to about 65 weight percent, specifically about 40 to about 60 weight percent, more specifically about 45 to about 55 weight percent.

In some embodiments, the electrically conductive thermoplastic composition comprises about 1.5 to about 8 weight percent, specifically about 3 to about 7 weight percent, more specifically about specifically about 4 to about 6 weight percent, based on the weight of the electrically conductive thermoplastic composition, of the wax.

One embodiment is an electrically conductive thermoplastic composition, comprising: a poly(arylene ether) in an amount of about 20 to about 50 weight percent, based on the weigh of the electrically conductive thermoplastic composition; a polyamide in an amount of about 30 to about 70 weight percent, based on the weight of the electrically conductive thermoplastic composition; and a carbon nanotube masterbatch in an amount of about 2 to about 20 weight percent, based on the weight of the electrically conductive thermoplastic composition; wherein the carbon nanotube masterbatch comprises carbon nanotubes in an amount of about 10 to about 40 weight percent, based on the weight of the carbon nanotube masterbatch, and a wax having a melting point of about 45 to about 150° C. in an amount of about 60 to about 90 weight percent, based on the weight of the carbon nanotube masterbatch; wherein the electrically conductive thermoplastic composition exhibits a volume resistivity less than or equal to 3,000 ohm-centimeters, and a melt viscosity of less than or equal to 200 pascal-seconds measured at 282° C. and a shear rate of 1,500 second$^{-1}$. The volume resistivity can be about 1,000 to 3,000 ohm-centimeters, specifically about 1,500 to about 2,500 ohm-centimeters. The melt viscosity can be about 160 to 200 pascal-seconds, specifically about 175 to about 195 pascal-seconds.

The invention includes at least the following embodiments.

Embodiment 1

A method of forming an electrically conductive thermoplastic composition, comprising: melt blending about 80 to about 98 weight percent, based on the weight of the electrically conductive thermoplastic composition, of a polymer, and about 2 to about 20 weight percent, based on the weight of the electrically conductive thermoplastic composition, of a carbon nanotube masterbatch comprising, based on the weight of the carbon nanotube masterbatch, about 10 to about 40 weight percent of carbon nanotubes, and about 60 to about 90 weight percent of a wax having a melting point of about 45 to about 150° C.

Embodiment 2

The method of embodiment 1, wherein the wax is selected from the group consisting of fatty alcohols, fatty acids, fatty acid salts, fatty acid amides, fatty acid esters, polyolefin waxes, paraffin waxes, and combinations thereof.

Embodiment 3

The method of embodiment 1 or 2, wherein the wax comprises a fatty alcohol selected from the group consisting of cetyl alcohol, stearyl alcohol, arachidyl alcohol, behenyl alcohol, lignoceryl alcohol, ceryl alcohol, montanyl alcohol, myricyl alcohol, geddyl alcohol, and combinations thereof.

Embodiment 4

The method of any of embodiments 1-3, wherein the wax comprises a fatty acid selected from the group consisting of myristic acid, palmitic acid, stearic acid, arachidic acid, behenic acid, lignoceric acid, cerotic acid, montanic acid, and combinations thereof.

Embodiment 5

The method of any of embodiments 1-4, wherein the wax comprises a fatty acid salt selected from the group consisting of calcium laurate, calcium stearate, calcium montanate, zinc stearate, and combinations thereof.

Embodiment 6

The method of any of embodiments 1-5, wherein the wax comprises a fatty acid amide selected from the group consisting of lauramide, myristamide, palmitamide, stearamide, arachidamide, behenamide, lignoceramide, cerotamide, montanamide, erucamide, oleamide, ethylene bis(lauramide), ethylene bis(stearamide), and combinations thereof.

Embodiment 7

The method of any of embodiments 1-6, wherein the wax comprises a fatty acid ester selected from the group consisting of glycerol monostearate, ethylene glycol montanate, glycerol montanate, pentaerythritol tetrastearate, trimethylolpropane tristearate, sorbitan tristearate, and combinations thereof.

Embodiment 8

The method of any of embodiments 1-7, wherein the wax comprises pentaerythritol tetrastearate.

Embodiment 9

The method of any of embodiments 1-8, wherein the wax comprises a polyolefin wax selected from the group consisting of polyethylene waxes, polar polyethylene waxes, polypropylene waxes, polar polypropylene waxes, and mixtures thereof.

Embodiment 10

The method of any of embodiments 1-9, wherein the wax comprises a paraffin wax.

Embodiment 11

The method of any of embodiments 1-10, wherein the polymer is selected from the group consisting of polyesters, poly(vinyl chloride)s, polystyrenes, rubber-modified polystyrenes, polyolefins, polycarbonates, polyimides, polyetherimides, poly(ether ketone)s, poly(ether ether ketone)s, polysulfones, poly(arylene ether)s, poly(phenylene sulfide)s, polyamides, copolymers of styrene and acrylonitrile, copolymers of alpha-methylstyrene and acrylonitrile, copolymers of acrylonitrile and butadiene and styrene, copolymers of acrylonitrile and styrene and acrylate esters, polyacetals, thermoplastic polyurethanes, and combinations thereof.

Embodiment 12

The method of any of embodiments 1-11, wherein the polymer comprises a poly(arylene ether).

Embodiment 13

The method of any of embodiments 1-12, wherein the polymer comprises a poly(arylene ether) and a polyamide.

Embodiment 14

The method of any of embodiments 1-13, wherein the polymer comprises a poly(arylene ether) and a polystyrene.

Embodiment 15

The method of any of embodiments 1-14, wherein the polymer comprises a poly(arylene ether) and a rubber-modified polystyrene.

Embodiment 16

The method of any of embodiments 1-15, wherein the polymer comprises a poly(arylene ether) and a polyolefin.

Embodiment 17

The method of any of embodiments 1-16, wherein the polymer comprises a poly(arylene ether) and a poly(phenylene sulfide).

Embodiment 18

The method of any of embodiments 1-17, wherein the polymer comprises a poly(arylene ether) and a polyester.

Embodiment 19

The method of any of embodiments 1-18, wherein the nanotubes comprise single wall carbon nanotubes.

Embodiment 20

The method of any of embodiments 1-19, wherein the nanotubes comprise multiwall carbon nanotubes.

Embodiment 21

The method of claim 1, wherein the polymer comprises about 20 to about 50 weight percent, based on the weight of the electrically conductive thermoplastic composition, of a poly(arylene ether); wherein the polymer further comprises about 30 to about 70 weight percent, based on the weight of the electrically conductive thermoplastic composition, of a polyamide; wherein said melt blending comprises melt blending the poly(arylene ether) and the polyamide to form a polymer blend, and melt blending the polymer blend with the carbon nanotube masterbatch; wherein said melt blending the poly(arylene ether) and the polyamide and said melt blending the polymer blend with the carbon nanotube masterbatch are both conducted within a single pass through an extruder.

Embodiment 22

The method of claim 1, wherein the polymer comprises about 20 to about 50 weight percent, based on the weight of the electrically conductive thermoplastic composition, of a poly(arylene ether); wherein the polymer further comprises about 30 to about 70 weight percent, based on the weight of the electrically conductive thermoplastic composition, of a polyamide; wherein said melt blending comprises melt blending the poly(arylene ether) and the polyamide to form a polymer blend, pelletizing the polymer blend, and melt blending the pelletized polymer blend with the carbon nanotube masterbatch.

Embodiment 23

The method of embodiment 1, wherein the electrically conductive thermoplastic composition comprises about 88 to about 96 weight percent, based on the weight of the electrically conductive thermoplastic composition, of the polymer; wherein the polymer comprises a poly(arylene ether) and a polyamide; wherein the electrically conductive thermoplastic composition comprises about 2 to about 12 weight percent, based on the weight of the electrically conductive thermoplastic composition, of the wax; wherein the wax comprises pentaerythritol tetrastearate; and wherein the carbon nanotubes comprise multiwall carbon nanotubes.

Embodiment 24

The method of embodiment 23, wherein the polymer comprises about 20 to about 50 weight percent, based on the weight of the electrically conductive thermoplastic composition, of the poly(arylene ether); and wherein the polymer further comprises about 30 to about 70 weight percent, based on the weight of the electrically conductive thermoplastic composition, of the polyamide.

Embodiment 25

The method of embodiment 23 or 24, wherein the electrically conductive thermoplastic composition comprises about 1.5 to about 8 weight percent, based on the weight of the electrically conductive thermoplastic composition, of the wax.

Embodiment 26

A method of forming a carbon nanotube masterbatch, comprising: blending about 10 to about 40 weight percent of carbon nanotubes, and about 60 to about 90 weight percent of a wax having a melting point of about 45 to about 150° C.; wherein all weight percents are based on the weight of the carbon nanotube masterbatch.

Embodiment 27

The method of embodiment 26, wherein said blending comprises melt blending at a temperature about 10 to about 150 degrees centigrade above the melting point of the wax.

Embodiment 28

The method of embodiment 26 or 27, wherein the wax comprises pentaerythritol tetrastearate.

Embodiment 29

The method of any of embodiments 26-28, wherein the carbon nanotube masterbatch consists of the carbon nanotubes and the wax.

Embodiment 30

A carbon nanotube masterbatch formed by the process of any of embodiments 26-29.

Embodiment 31

An electrically conductive thermoplastic composition, comprising: a poly(arylene ether) in an amount of about 20 to about 50 weight percent, based on the weight of the electrically conductive thermoplastic composition; a polyamide in an amount of about 30 to about 70 weight percent, based on the weight of the electrically conductive thermoplastic composition; and a carbon nanotube masterbatch in an amount of about 2 to about 20 weight percent, based on the weight of the electrically conductive thermoplastic composition; wherein the carbon nanotube masterbatch comprises carbon nanotubes in an amount of about 10 to about 40 weight percent, based on the weight of the carbon nanotube masterbatch, and a wax having a melting point of about 45 to about 150° C. in an amount of about 60 to about 90 weight percent, based on the weight of the carbon nanotube masterbatch; wherein the electrically conductive thermoplastic composition exhibits a volume resistivity less than or equal to 3,000 ohm-centimeters, and a melt viscosity of less than or equal to 200 pascal-seconds measured at 282° C. and a shear rate of 1,500 second$^{-1}$.

The invention is further illustrated by the following non-limiting examples.

Example 1

Comparative Examples 1 and 2

Components used to prepare electrically conductive thermoplastic composition are summarized in Table 1, and the compositions themselves are summarized in Table 2. The electrically conductive thermoplastic compositions were prepared using a three-lobe, twin-screw ZSK 28 extruder from Werner and Pfleiderer.

For Comparative Example 1, the poly(arylene ether) and citric acid were introduced together with two impact modifiers and stabilizers at the throat of the extruder. Downstream in a feedport located approximately ⅓ down the length of the extruder a polyamide and a masterbatch of carbon nanotubes in polyamide were added. For Comparative Example 2, the same procedure was followed except that the downstream addition consisted of a polyamide, pentaerythritol tetrastearate, and a masterbatch of carbon nanotubes in polyamide. For Example 1, the Comparative Example 1 procedure was again followed, except that the downstream addition consisted of a polyamide and a masterbatch of carbon nanotubes in wax.

Properties of the compositions are summarized in Table 2. Volume resistivity values, expressed in units of ohm-centimeters, were determined at 23° C. as follows. A tensile bar is molded according to ISO 3167 (2002). A sharp, shallow cut is made near each end of the narrow central portion of the bar. The bar is fractured in a brittle fashion at each cut to separate the narrow central portion, now having fractured ends with cross-sectional dimensions of 10 millimeters by 4 millimeters. In order to obtain fracturing in a brittle fashion, the tensile bar can first be cooled, for example, in dry ice, in a freezer at −40° C., or in liquid nitrogen. The length of the bar between the fractured ends is measured. The fractured ends of the sample are painted with conductive silver paint, and the paint is allowed to dry. Using a multi-meter, electrodes are attached to each of the painted surfaces, and the resistance is measured at an applied voltage of 500 millivolts to 1000 millivolts. Values of the volume resistivity are obtained by multiplying the measured resistance by the fracture area of one side of the bar and dividing by the length of the bar $$r = R \times A / L$$

where r is the volume resistivity in ohm-centimeters, R is the measured resistance in ohms, A is the fractured area in square centimeters, and L is the sample length in centimeters. The procedure is repeated for a total of five samples, and the results for the five samples are averaged to provide the reported volume resistivity value.

Melt viscosity values, expressed in units of pascal-seconds (Pa-s), were measured at 282° C. and a shear rate of 1500 $sec^{-1}$ according to ISO 11443-2005, Method A (capillary die). Tensile modulus values (expressed in units of megapascals) and tensile elongation values (express in units of percent), were measured at 23° C. according to ISO 527-1-1993 Amendment 1 2005 and ISO 527-2-1993 using a testing speed of 1.0 millimeter per minute. Notched Izod impact strength value (expressed in units of kilojoules per square-meter) were measured at 23° C. according to ISO 180-2000, Amendment 1 2006. Vicat temperature values (expressed in units of ° C.), were measured according to ISO 306-2004, Method B50 using a 50 Newton load and a 120° C./hour heating rate.

The results in Table 2 show that Example 1, prepared using a carbon nanotube/wax masterbatch, exhibited the lowest volume resistivity and the lowest melt viscosity of the three compositions. The volume resistivity of Example 1 was unexpectedly much lower than that of Comparative Example 2, in which the same wax was added as a separate component rather than as part of the carbon nanotube masterbatch. The Vicat temperature values (indicative of heat resistance) were modestly reduced for the wax-containing Comparative Example 2 and Example 1 relative to wax-free Comparative Example 1. However, it may be possible to use fillers to increase heat resistance and reduce coefficient of thermal expansion.

TABLE 1

| Component | Description |
| --- | --- |
| PPE | Poly(2,6-dimethyl-1,4-phenylene ether) having an intrinsic viscosity of about 0.41 deciliter per gram in chloroform at 25° C.; obtained as PPO 803 from SABIC Innovative Plastics. |
| PA-6,6 | Polyamide-6,6 (CAS Reg. No. 32131-17-2) having a reduced viscosity of about 120-130 milliliters/gram and an amino endgroup concentration of about 40-60 milliequivalents/gram; obtained from Rhodia. |
| SEBS | Polystyrene-poly(ethylene-butylene)-polystyrene triblock copolymer (CAS Reg. No. 66070-58-4) having a polystyrene content of about 30-33 weight percent; obtained from Kraton Polymers as KRATON G1651. |
| SEP | Polystyrene-poly(ethylene-propylene) diblock copolymer (CAS Reg. No. 68648-89-5) having a polystyrene content of about 37 weight percent; obtained from Kraton Polymers as KRATON G1701. |
| Citric acid | Citric acid (CAS Reg. No. 77-92-9), obtained from Jungbunzlauer. |
| Stabilizer | Hindered phenol stabilizer, octadecyl 3-(3,5-di-tert-butyl-4-hydroxyphenyl)propionate (CAS Reg. No. 2082-79-3); obtained from Ciba as IRGANOX 1076. |
| KI soln. | Potassium iodide (CAS Reg. No. 7681-11-0) 50 weight percent solution in water. |
| CuI | Cuprous iodide (CAS Reg. No. 7681-65-4). |
| PETS | Pentaerythritol tetrastearate (CAS Reg. No. 115-83-3); obtained from FACI SpA. |
| CNT/PA MB | Carbon nanotube masterbatch in polyamide-6,6; consisting of 80 weight percent polyamide-6,6 and 20 weight percent multiwall carbon nanotubes (CAS Reg. Nos. 7440-44-0, 7782-42-5); obtained from Nanocyl. |
| CNT/PETS MB | Carbon nanotube masterbatch in pentaerythritol tetrastearate; consisting of 80 weight percent pentaerythritol tetrastearate and 20 weight percent multiwall carbon nanotubes (CAS Reg. Nos. 7440-44-0, 7782-42-5); obtained from Holland Colours. |

TABLE 2

|  | C. Ex. 1 | C. Ex. 2 | Ex. 1 |
|---|---|---|---|
| COMPOSITIONS | | | |
| components added at feed throat | | | |
| PPE | 38.04 | 33.24 | 34.04 |
| SEBS | 7.00 | 7.00 | 7.00 |
| SEP | 3.50 | 3.50 | 3.50 |
| Citric acid | 0.65 | 0.65 | 0.65 |
| Stabilizer | 0.30 | 0.30 | 0.30 |
| KI soln. | 0.10 | 0.10 | 0.10 |
| CuI | 0.01 | 0.01 | 0.01 |
| components added at side feeder | | | |
| PA-6,6 | 44.44 | 44.44 | 48.40 |
| CNT/PA MB | 6.00 | 6.00 | 0 |
| CNT/PETS MB | 0 | 0 | 6.00 |
| PETS | 0 | 4.80 | 0 |
| PROPERTIES | | | |
| Volume resistivity (ohm-cm) | 3,500 | 90,000,000 | 1,500 |
| Melt viscosity, 282° C., 1500 sec$^{-1}$ (Pa-s) | 205 | 160 | 175 |
| Tensile modulus, 23° C. (MPa) | 2300 | 1900 | 2100 |
| Tensile elongation at break, 23° C. (%) | 35 | 34 | 35 |
| Notched Izod impact, 23° C. (kJ/m$^2$) | 21 | 21 | 22 |
| Vicat temperature (° C.) | 199 | 178 | 178 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of forming an electrically conductive thermoplastic composition, comprising:
   melt blending
   about 80 to about 98 weight percent, based on the weight of the electrically conductive thermoplastic composition, of a polymer, and
   about 2 to about 20 weight percent, based on the weight of the electrically conductive thermoplastic composition, of a carbon nanotube masterbatch comprising, based on the weight of the carbon nanotube masterbatch,
      about 10 to about 40 weight percent of carbon nanotubes, and
      about 60 to about 90 weight percent of a wax having a melting point of about 45 to about 150° C. wherein the wax comprises a fatty acid ester selected from the group consisting of glycerol monostearate, ethylene glycol montanate, glycerol montanate, pentaerythritol tetrastearate, trimethylolpropane tristearate, sorbitan tristearate, and combinations thereof.

2. The method of claim 1, wherein the wax comprises pentaerythritol tetrastearate.

3. The method of claim 1, wherein the polymer is selected from the group consisting of polyesters, poly(vinyl chloride)s, polystyrenes, rubber modified polystyrenes, polyolefins, polycarbonates, polyimides, polyetherimides, poly(ether ketone)s, poly(ether ether ketone)s, polysulfones, poly(arylene ether)s, poly(phenylene sulfide)s, polyamides, copolymers of styrene and acrylonitrile, copolymers of alpha-methylstyrene and acrylonitrile, copolymers of acrylonitrile and butadiene and styrene, copolymers of acrylonitrile and styrene and acrylate esters, polyacetals, thermoplastic polyurethanes, and combinations thereof.

4. The method of claim 1, wherein the polymer comprises a poly(arylene ether).

5. The method of claim 1, wherein the polymer comprises a poly(arylene ether) and a polyamide.

6. The method of claim 1, wherein the polymer comprises a poly(arylene ether) and a polystyrene.

7. The method of claim 1, wherein the polymer comprises a poly(arylene ether) and a rubber-modified polystyrene.

8. The method of claim 1, wherein the polymer comprises a poly(arylene ether) and a polyolefin.

9. The method of claim 1, wherein the polymer comprises a poly(arylene ether) and a poly(phenylene sulfide).

10. The method of claim 1, wherein the polymer comprises a poly(arylene ether) and a polyester.

11. The method of claim 1, wherein the nanotubes comprise single wall carbon nanotubes.

12. The method of claim 1, wherein the nanotubes comprise multiwall carbon nanotubes.

13. The method of claim 1,
   wherein the polymer comprises about 20 to about 50 weight percent, based on the weight of the electrically conductive thermoplastic composition, of a poly(arylene ether);
   wherein the polymer further comprises about 30 to about 70 weight percent, based on the weight of the electrically conductive thermoplastic composition, of a polyamide;
   wherein said melt blending comprises
      melt blending the poly(arylene ether) and the polyamide to form a polymer blend, and
      melt blending the polymer blend with the carbon nanotube masterbatch;
   wherein said melt blending the poly(arylene ether) and the polyamide and said melt blending the polymer blend with the carbon nanotube masterbatch are both conducted within a single pass through an extruder.

14. The method of claim 1,
wherein the polymer comprises about 20 to about 50 weight percent, based on the weight of the electrically conductive thermoplastic composition, of a poly(arylene ether);
wherein the polymer further comprises about 30 to about 70 weight percent, based on the weight of the electrically conductive thermoplastic composition, of a polyamide;
wherein said melt blending comprises
melt blending the poly(arylene ether) and the polyamide to form a polymer blend,
pelletizing the polymer blend, and
melt blending the pelletized polymer blend with the carbon nanotube masterbatch.

15. The method of claim 1,
wherein the electrically conductive thermoplastic composition comprises about 88 to about 96 weight percent, based on the weight of the electrically conductive thermoplastic composition, of the polymer;
wherein the polymer comprises a poly(arylene ether) and a polyamide;
wherein the electrically conductive thermoplastic composition comprises about 2 to about 12 weight percent, based on the weight of the electrically conductive thermoplastic composition, of the wax;
wherein the wax comprises pentaerythritol tetrastearate; and
wherein the carbon nanotubes comprise multiwall carbon nanotubes.

16. The method of claim 15,
wherein the polymer comprises about 20 to about 50 weight percent, based on the weight of the electrically conductive thermoplastic composition, of the poly(arylene ether); and
wherein the polymer further comprises about 30 to about 70 weight percent, based on the weight of the electrically conductive thermoplastic composition, of the polyamide.

17. The method of claim 13, wherein the electrically conductive thermoplastic composition comprises about 1.5 to about 8 weight percent, based on the weight of the electrically conductive thermoplastic composition, of the wax.

18. A method of forming a carbon nanotube masterbatch, comprising:
blending
about 10 to about 40 weight percent of carbon nanotubes, and
about 60 to about 90 weight percent of a wax having a melting point of about 45 to about 150° C.;
wherein all weight percents are based on the weight of the carbon nanotube masterbatch and the wax comprises a fatty acid ester selected from the group consisting of glycerol monostearate, ethylene glycol montanate, glycerol montanate, pentaerythritol tetrastearate, trimethylolpropane tristearate, sorbitan tristearate, and combinations thereof.

19. The method of claim 18, wherein said blending comprises melt blending at a temperature about 10 to about 150 degrees centigrade above the melting point of the wax.

20. The method of claim 18, wherein the wax comprises pentaerythritol tetrastearate.

21. The method of claim 18, wherein the carbon nanotube masterbatch consists of the carbon nanotubes and the wax.

22. A carbon nanotube masterbatch formed by the process of claim 18.

* * * * *